United States Patent
Fürsich

(10) Patent No.: US 10,908,417 B2
(45) Date of Patent: Feb. 2, 2021

(54) VEHICLE VISION SYSTEM WITH VIRTUAL RETINAL DISPLAY

(71) Applicant: MAGNA ELECTRONICS INC., Auburn Hills, MI (US)

(72) Inventor: Manfred Fürsich, Oberhaching (DE)

(73) Assignee: MAGNA ELECTRONICS INC., Auburn Hills, MI (US)

(*) Notice: Subject to any disclaimer, the term of this patent is extended or adjusted under 35 U.S.C. 154(b) by 1501 days.

(21) Appl. No.: 14/489,659

(22) Filed: Sep. 18, 2014

(65) Prior Publication Data

US 2015/0092042 A1 Apr. 2, 2015

Related U.S. Application Data

(60) Provisional application No. 62/027,464, filed on Jul. 22, 2014, provisional application No. 61/905,461, filed on Nov. 18, 2013, provisional application No. 61/879,837, filed on Sep. 19, 2013.

(51) Int. Cl.

| | |
|---|---|
| *G02B 27/00* | (2006.01) |
| *G02B 27/01* | (2006.01) |
| *B60R 1/00* | (2006.01) |
| *H04N 7/18* | (2006.01) |
| *G02B 26/08* | (2006.01) |

(52) U.S. Cl.
CPC ............ *G02B 27/0093* (2013.01); *B60R 1/00* (2013.01); *G02B 27/0101* (2013.01); *B60R 2300/105* (2013.01); *B60R 2300/205* (2013.01); *G02B 26/0833* (2013.01); *G02B 2027/0138* (2013.01); *G02B 2027/0187* (2013.01); *H04N 7/18* (2013.01)

(58) Field of Classification Search
None
See application file for complete search history.

(56) References Cited

U.S. PATENT DOCUMENTS

| | | |
|---|---|---|
| 4,546,551 A | 10/1985 | Franks |
| 4,953,305 A | 9/1990 | Van Lente et al. |
| 5,530,240 A | 6/1996 | Larson et al. |
| 5,550,677 A | 8/1996 | Schofield et al. |
| 5,576,687 A | 11/1996 | Blank et al. |
| 5,632,092 A | 5/1997 | Blank et al. |
| 5,668,663 A | 9/1997 | Varaprasad et al. |
| 5,670,935 A | 9/1997 | Schofield et al. |
| 5,699,044 A | 12/1997 | Van Lente et al. |
| 5,708,410 A | 1/1998 | Blank et al. |
| 5,724,187 A | 3/1998 | Varaprasad et al. |
| 5,737,226 A | 4/1998 | Olson et al. |

(Continued)

*Primary Examiner* — Chikaodili E Anyikire
(74) *Attorney, Agent, or Firm* — Honigman LLP

(57) ABSTRACT

A vision system of a vehicle includes at least one camera disposed at a vehicle and having a field of view exterior of the vehicle. The at least one camera is operable to capture image data. A display disposed in the vehicle and viewable by a driver of the vehicle. The display is operable to display images derived from image data captured by the at least one camera. The display is a virtual retinal display that displays images at a virtual distance from the driver. When viewing images displayed by the virtual retinal display, the driver has the impression that the virtual distance from the driver's eyes to the displayed images is greater than the distance from the driver's eyes to the virtual retinal display.

18 Claims, 5 Drawing Sheets

(56) References Cited

U.S. PATENT DOCUMENTS

| | | | |
|---|---|---|---|
| 5,802,727 A | 9/1998 | Blank et al. | |
| 5,878,370 A | 3/1999 | Olson | |
| 5,910,854 A | 6/1999 | Varaprasad et al. | |
| 5,949,331 A | 9/1999 | Schofield et al. | |
| 6,087,953 A | 7/2000 | DeLine et al. | |
| 6,120,461 A * | 9/2000 | Smyth | A61B 3/113 600/558 |
| 6,173,501 B1 | 1/2001 | Blank et al. | |
| 6,222,460 B1 | 4/2001 | DeLine et al. | |
| 6,329,925 B1 | 12/2001 | Skiver et al. | |
| 6,420,036 B1 | 7/2002 | Varaprasad et al. | |
| 6,498,620 B2 | 12/2002 | Schofield et al. | |
| 6,513,252 B1 | 2/2003 | Schierbeek et al. | |
| 6,642,851 B2 | 11/2003 | DeLine et al. | |
| 6,690,268 B2 | 2/2004 | Schofield et al. | |
| 6,822,713 B1 | 11/2004 | Yaroshchuk et al. | |
| 6,917,693 B1 * | 7/2005 | Kiridena | B60R 1/00 348/E7.086 |
| 7,004,593 B2 | 2/2006 | Weller et al. | |
| 7,038,577 B2 | 5/2006 | Pawlicki et al. | |
| 7,184,190 B2 | 2/2007 | McCabe et al. | |
| 7,195,381 B2 | 3/2007 | Lynam et al. | |
| 7,245,273 B2 * | 7/2007 | Eberl | G02B 27/017 345/7 |
| 7,249,860 B2 | 7/2007 | Kulas et al. | |
| 7,253,723 B2 | 8/2007 | Lindahl et al. | |
| 7,255,451 B2 | 8/2007 | McCabe et al. | |
| 7,274,501 B2 | 9/2007 | McCabe et al. | |
| 7,289,037 B2 | 10/2007 | Uken et al. | |
| 7,308,341 B2 | 12/2007 | Schofield et al. | |
| 7,329,013 B2 | 2/2008 | Blank et al. | |
| 7,338,177 B2 | 3/2008 | Lynam | |
| 7,370,983 B2 | 5/2008 | DeWind et al. | |
| 7,400,233 B2 * | 7/2008 | Kondo | B60Q 9/008 340/435 |
| 7,423,522 B2 | 9/2008 | O'Brien et al. | |
| 7,433,772 B2 * | 10/2008 | Isaji | B60T 8/1755 701/71 |
| 7,446,650 B2 | 11/2008 | Schofield et al. | |
| 7,581,859 B2 | 9/2009 | Lynam | |
| 7,616,781 B2 | 11/2009 | Schofield et al. | |
| 7,626,749 B2 | 12/2009 | Baur et al. | |
| 7,720,580 B2 | 5/2010 | Higgins-Luthman | |
| 7,722,199 B2 | 5/2010 | DeWard et al. | |
| 7,726,434 B2 * | 6/2010 | Pochmuller | B60Q 9/005 180/281 |
| 7,855,755 B2 | 12/2010 | Weller et al. | |
| 7,937,667 B2 | 5/2011 | Kramer et al. | |
| 8,103,424 B2 * | 1/2012 | Isaji | B60K 31/0008 701/96 |
| 8,223,088 B1 * | 7/2012 | Gomez | G06F 3/03547 345/7 |
| 8,558,758 B2 * | 10/2013 | Sato | G03B 5/00 345/4 |
| 8,890,773 B1 * | 11/2014 | Pederson | H04B 1/385 345/8 |
| 9,264,672 B2 | 2/2016 | Lynam | |
| 9,529,191 B2 * | 12/2016 | Sverdrup | G02B 27/017 |
| 2003/0169213 A1 * | 9/2003 | Spero | G02B 27/0093 345/7 |
| 2006/0050018 A1 | 3/2006 | Hutzel et al. | |
| 2006/0061008 A1 | 3/2006 | Karner et al. | |
| 2009/0231687 A1 | 9/2009 | Yamamoto | G02B 27/01 359/359 |
| 2010/0060551 A1 * | 3/2010 | Sugiyama | G02B 26/06 345/8 |
| 2010/0097580 A1 * | 4/2010 | Yamamoto | G02B 27/0172 353/69 |
| 2012/0062743 A1 | 3/2012 | Lynam et al. | |
| 2012/0154591 A1 | 6/2012 | Baur et al. | |
| 2012/0224062 A1 * | 9/2012 | Lacoste | G02B 27/01 348/148 |
| 2012/0281093 A1 * | 11/2012 | Fong | G06K 9/00805 348/148 |
| 2013/0250114 A1 | 9/2013 | Lu | |
| 2014/0022390 A1 | 1/2014 | Blank et al. | |
| 2014/0160284 A1 | 6/2014 | Achenbach et al. | |
| 2014/0333729 A1 | 11/2014 | Pflug | |
| 2014/0340510 A1 | 11/2014 | Ihlenburg | |
| 2015/0022664 A1 | 1/2015 | Pflug et al. | |
| 2015/0049193 A1 | 2/2015 | Gupta et al. | |

\* cited by examiner

VEHICLE VISION SYSTEM WITH VIRTUAL RETINAL DISPLAY

CROSS REFERENCE TO RELATED APPLICATIONS

The present application claims the filing benefits of U.S. provisional applications, Ser. No. 62/027,464, filed Jul. 22, 2014; Ser. No. 61/905,461, filed Nov. 18, 2013, and Ser. No. 61/879,837, filed Sep. 19, 2013, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras (preferably one or more CMOS cameras) to capture image data representative of images exterior of the vehicle, and provides the communication/data signals, including camera data or captured image data, that may be displayed at a display screen that is viewable by the driver of the vehicle, such as when the driver is backing up the vehicle, driving forward or standing, and that may be processed and, responsive to such image processing, the system may detect an object at or near the vehicle and in the path of travel of the vehicle, such as when the vehicle is backing up. The vision system may be operable to display a surround view or bird's eye view of the environment at or around or at least partially surrounding the subject or equipped vehicle, and the displayed image may include a displayed image representation of the subject vehicle. The vision system may also be used as replacement of known or conventional rearview mirrors. The display comprises a virtual retinal display that is operable to display images derived from image data captured by the camera and gives the driver the impression to see the image at an increased virtual distance.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a forward or rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
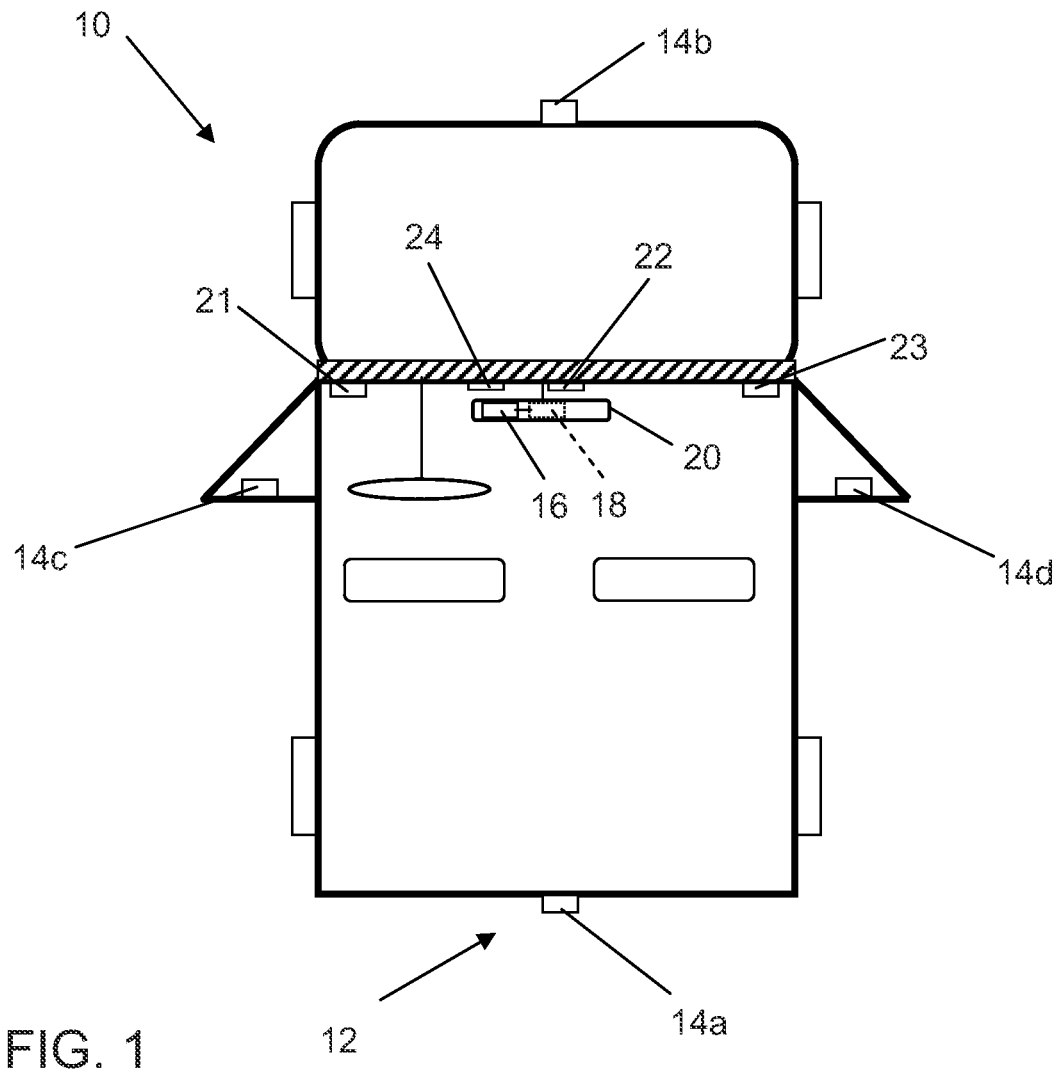
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or display device may be disposed elsewhere at or in the vehicle). Other possible positions of the virtual retinal displays are the left side 21, center 22, 24 and/or the right side 23 of the vehicle dashboard. The data transfer or signal communication from the camera to the ECU may comprise any suitable data or communication link, such as a vehicle network bus or the like of the equipped vehicle.

Typically, vehicles include mirrors which allow the driver to monitor the rear and side area of a vehicle. These mirrors are required to get the homologation of a vehicle. There have been suggestions to replace mirrors with camera-monitor-systems (CMS). The ISO standard 16505 will be the basis for future homologations of camera monitor systems in different nations. The currently on the market existing ADAS camera systems provide additional assistance to the driver but are not for mirror replacement.

One concern with camera-monitor-systems is the presbyopia. Whereas children are able to adapt their eyes from very small distances to infinity quickly, this ability reduces with age. For example, a child may have an accommodation ability of 20 dioptres, while a 25 year old young adult may have an accommodation ability of about 10 dioptres, and an older person, such as around 60 years old, may have an accommodation ability of about 0.5 to about 1 dioptres.

The distance between the monitor of a CMS and the eyes of the driver depends on the design of the vehicle and the installation of the monitors. However, it also depends on the size of the driver. For example, the distance from the driver's eyes to the monitor may be about 1.2 m for a larger driver, but only about 70 cm for a smaller or petite driver.

Thus, a 60 year old small or petite person will not likely be able see the monitor correctly sharp. Elder drivers typically have to use bifocal eyeglasses or varifocal eyeglasses to drive a vehicle with a CMS and to be able to view the displayed images. This problem may be important to get a homologation for a CMS and also may be an obstacle to the person to consider when purchasing such a vehicle.

Table 1 below gives some explanations to the terms "head-up display", "virtual retinal display" and "retinal display":

TABLE 1

Explanation of Terms

| Term | Virtual Image | Further Aspects |
| --- | --- | --- |
| Head-up Display | The image is projected to the retina of the human eye. The virtual image is seen by the user at "infinity". | Head-up means additionally that the device is located near the standard viewing direction of the driver. The driver needs not to raise or lower the head. Therefore the image is mostly projected to the windshield. |
| Virtual Retinal Display | Presbyopia problems are avoided | This term is more general and gives no restriction where the device has to be located. |
| Retinal Display | Normal display with the real image at the location of the display. | Expression from the advertisement of smartphone manufacturers to emphasize the high resolution of their displays |

Head-up displays are commonly used in cars and airplanes to provide visual (augmented) information to the driver like overlays of the current speed, arrows as proposals of a navigation system or driver control confirmations. For this information a limited resolution is sufficient. As the image is projected on the windshield there is a limitation by the fact that the street scenery must not be hidden too much by the displayed image.

With the virtual retinal display of present invention the situation is different:

An image coming from one or several cameras shows a scenery outside the vehicle.

This image shall have a higher resolution so that the driver can see detailed objects outside the vehicle, for example a vehicle coming from the rear.

As a consequence the image must not be projected to the windshield because the mixture of the displayed image and street in front of the vehicle would confuse the driver.

Typical positions for the proposed virtual retinal display are the left and right A-columns, the dashboard and the inner rear view mirror position.

Different types of virtual retinal displays respectively head-up displays have been developed. For example Micro-Vision constructed a head-up display using laser scanning technology. NEC and Brother offer virtual retinal displays incorporated into eyeglasses.

Figure 2:
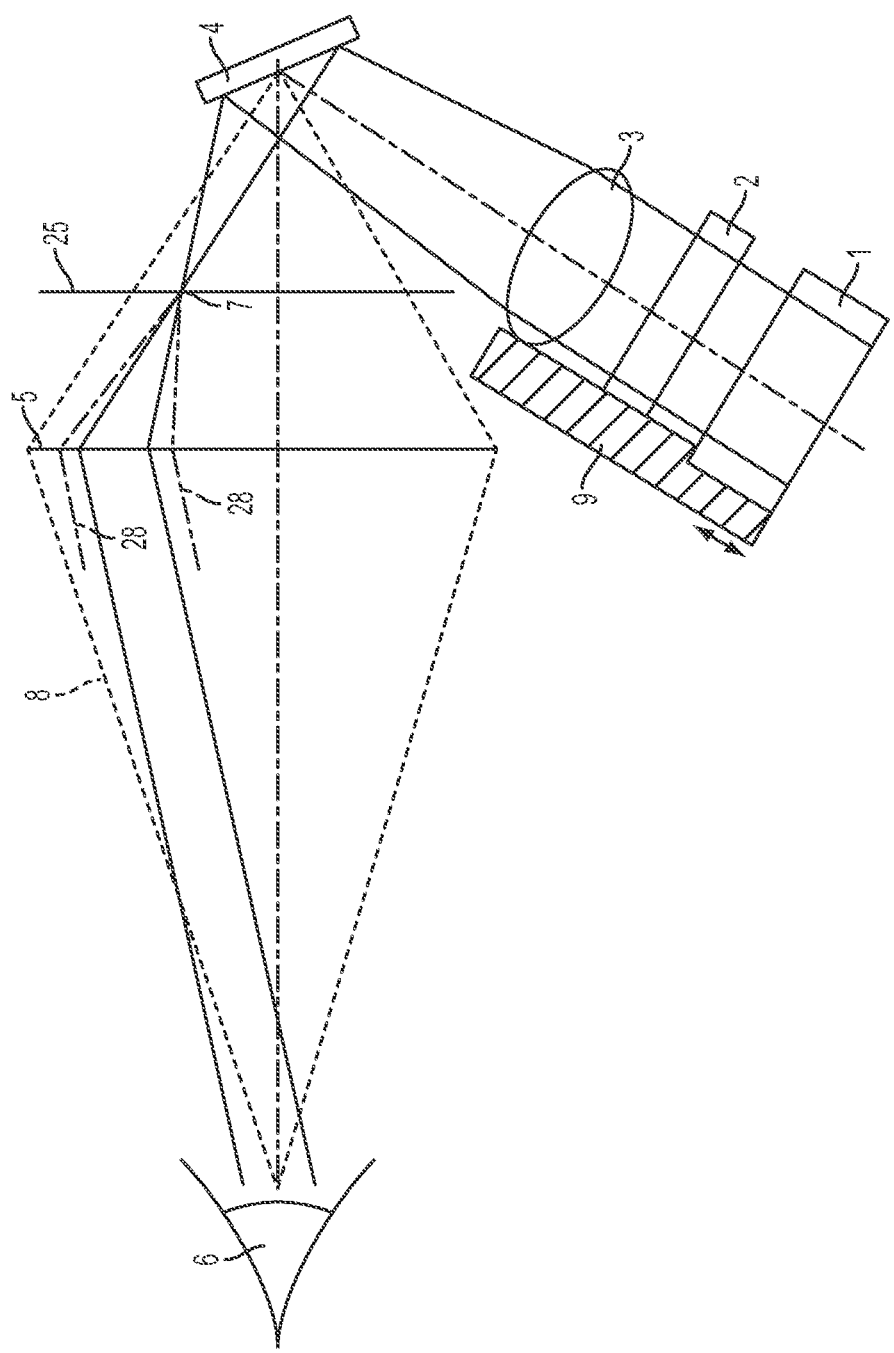
FIG. 2 is a schematic showing a known virtual retinal display.

Use of a virtual retinal display with respect to head-up displays in a vehicle is described for example in the white paper of MicroVision "MEMS Scanned Laser Head-Up Display" (http://spie.org/Publications/Proceedings/Paper/10.1117/12.879031). Such a known virtual retinal display is shown in FIG. 2. Such micro displays are described, for example, in U.S. Pat. Nos. 7,253,723; 7,616,781; 7,937,667; 7,423,522 and/or 7,722,199, and/or U.S. Publication No. US-2006-0061008, which are hereby incorporated herein by reference in their entireties. The display may also or otherwise utilize aspects of the displays described in U.S. Pat. Nos. 6,498,620; 6,690,268; 7,195,381 and/or 7,855,755, which are hereby incorporated herein by reference in their entireties.

The present invention provides a virtual retinal display that is operable to display images for viewing by the driver of the vehicle when normally operating the vehicle or when standing still. The virtual retinal display may comprise drive electronics, which receive a video input, such as from a video camera or the like. Several different proposals are shown in FIGS. 2-5. A real image or a virtual image 32 (FIGS. 4 and 5) is generated. The light rays coming from the image 32 are widened respectively adjusted by an exit pupil expander 25 (FIG. 2). The image 32 is then projected with the relay optic 5 to the human eye. The images projected onto the retina appear as if the image existed in a far or further distance in front of the user.

With the vision system of the present invention, the distance between the driver's eye and the virtual retinal display is only about 50 cm to about 1.2 m. However, when viewing the display, the driver has the impression that the display is about 5 m or more away from the driver's eyes.

The target of the present invention is to improve a camera-monitor-system (CMS) in a vehicle. The following situations may occur:

Case 1:

An elder driver sees correctly to far distances without eyeglasses or using simple eyeglasses, but does not see correctly or well at low or smaller distances. In this case, the virtual retinal display may project the image to a high virtual distance or even to infinity.

Case 2:

It may occur that the elder driver is already using varifocal or bifocal eyeglasses. In this case, it is advantageous to provide adjustment means which allow the driver to set or customize the projection distance to his personal needs or preferences.

A concern with the virtual retinal display may be the limited range of head movement without leaving the imaging range (i.e., if the driver moves his or her head too much side to side or forward or rearward, it effects the viewing of the display by the driver).

The following methods help to overcome this problem:

The exit pupil enhancement unit or element 25 increases the eyebox in where the driver has to keep his head to see the (rear view) vision properly.

An eye tracking system may actively adapt the devise to the modified position of the driver's head.

FIG. 2 shows a virtual retinal display similar to the display described in the white paper of MicroVision "MEMS Scanned Laser Head-Up Display", referenced above. The virtual retinal display comprises three laser light sources 1 for the colors red, green and blue and means to modulate and to combine the three laser lights 2. There is a first optic 3, which focuses the light to position 7. The light passes a scanning mirror 4. This mirror can be realized as a rotating mirror or as a scanning micro-mirror array. Reference number 25 refers to an exit pupil enhancement element or unit, which increases the viewing range 28 and allows stronger movements of the driver's head. MicroVision uses for this unit as a diffusor a micro lens plate.

A second optic, the relay optic 5, fulfills two tasks: On one hand, the scanning mirror 4 is displayed to the region of the driver's eyes 6, and on the other hand, the light coming from the focus point 7 respectively the virtual image 32 is made parallel. Therefore, the driver gets the impression that the displayed image is at infinity or far away or farther away than the display screen actually is from the driver. The following aspects of this arrangement are new and exceed the state-of-the-art including the art discussed above:

A Fresnel lens can be used as relay optic 5.

Reference number 9 refers to an adjustment tool. The lens 3 can be moved forward or rearward thereby adjusting the device to the individual needs of the driver, such as diopter adjustment for the driver with presbyopia (so a driver may increase the virtual distance to improve the driver's ability to focus on the virtual displayed image).

A sidewise shift of optic 5 with respect to units 1, 2, 3, 4 moves the target regime of the driver's eyes. Such a shift may be done as manual adjustment by the driver or as automatically by a head tracking unit.

Figure 3:
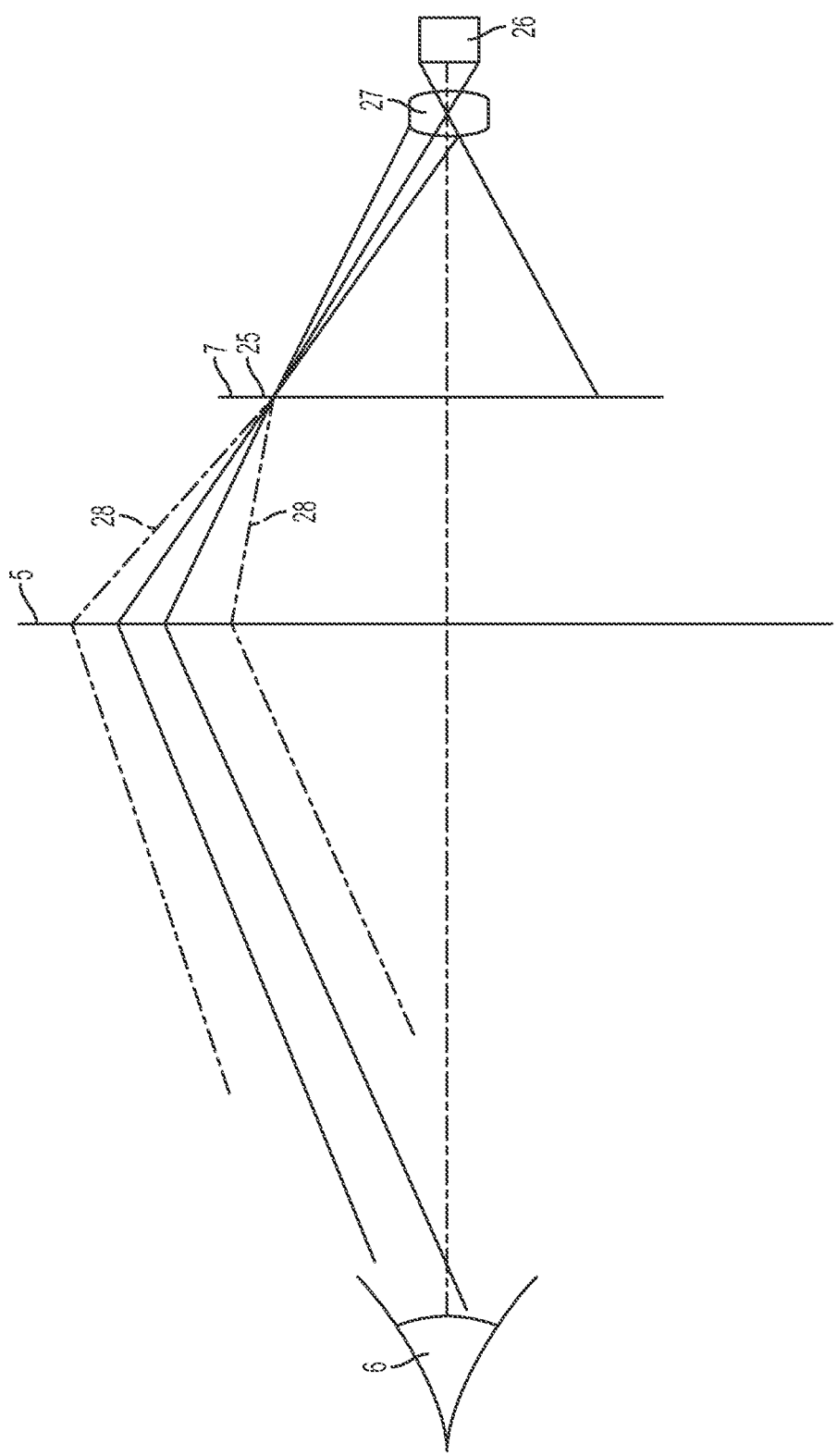
FIG. 3 is a schematic showing a virtual retinal display according to the present invention using micro LCD technology.

FIG. 3 shows a second approach with the use of a LCD display, especially a LCoS (Liquid Crystal on Silicon) microdisplay, which has an increasing importance for low cost projection units. An LCoS unit 26 is shown in FIG. 3. Such units are state-of-the-art and are, for example, part of micro-projectors. The image generated in the LCoS unit is projected to position 7 and creates the virtual image. In order to increase the eyebox, the allowed viewing range of the driver, an exit pupil enhancement plate 25 is added to the system. The plate 25 can be realized as a glass plate with a diffusing surface. Alternatively, it can be realized by a micro lens array. The relay optics 5 makes parallel light at the position of the driver's eye 6. By moving the units 25, 26 and 27 together forward or backward, a diopter adjustment can be realized. A relative shift of optics 5 with respect to units 25, 26, 27 allows shifting of the viewing range.

Figure 4:
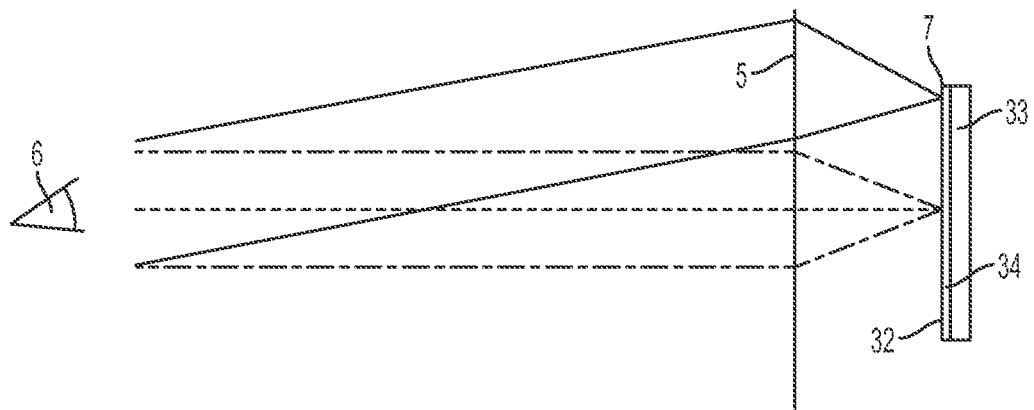
FIG. 4 is a schematic showing another virtual retinal display according to the present invention using macro LCD technology.

FIG. 4 shows another approach using also using a LCD display 33. Compared to FIG. 3, the size of the LCD is larger. The LCD is put at the position 7 and yields the real image 32. The width of the rays coming from the image 32 has to be widened and adjusted properly for viewing by the driver's eyes 6. A common method to do this is the usage of an optical compensation film 34 within the LCD, such as described, for example, in U.S. Pat. No. 6,822,713, which is hereby incorporated herein by reference in its entirety.

Figure 5:
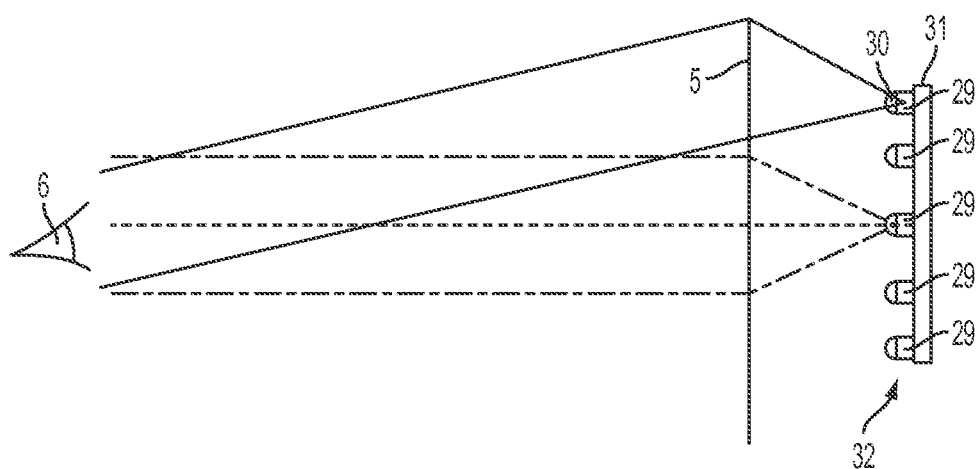
FIG. 5 is a schematic showing another virtual retinal display according to the present invention using a LED matrix.

FIG. 5 shows another approach, where a plate 31 contains a field of LEDs 29. Above each LED there is a micro lens 30. The individual micro lens is positioned in such a way that the light (and image 32) is projected onto the relay optic 5 in an adequate radiation angle for viewing by the driver's eyes 6.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580; and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592 and/or PCT Application No. PCT/US2014/042229, filed Jun. 13, 2014, and/or U.S. patent application Ser. No. 14/324,696, filed Jul. 7, 2014; Ser. No. 14/369,229, filed Jun. 27, 2014; Ser. No. 14/316,940, filed Jun. 27, 2014; Ser. No. 14/316,939, filed Jun. 27, 2014; Ser. No. 14/303,696, filed Jun. 13, 2014; Ser. No. 14/303,695, filed Jun. 13, 2014; Ser. No. 14/303,694, filed Jun. 13, 2014; Ser. No. 14/303,693, filed Jun. 13, 2014; Ser. No. 14/297,663, filed Jun. 6, 2014; Ser. No. 14/362,636, filed Jun. 4, 2014; Ser. No. 14/290,028, filed May 29, 2014; Ser. No. 14/290,026, filed May 29, 2014; Ser. No. 14/359,341, filed May 20, 2014; Ser. No. 14/359,340, filed May 20, 2014; Ser. No. 14/282,029, filed May 20, 2014; Ser. No. 14/282,028, filed May 20, 2014; Ser. No. 14/358,232, filed May 15, 2014; Ser. No. 14/272,834, filed May 8, 2014; Ser. No. 14/356,330, filed May 5, 2014; Ser. No. 14/269,788, filed May 5, 2014; Ser. No. 14/268,169, filed May 2, 2014; Ser. No. 14/264,443, filed Apr. 29, 2014; Ser. No. 14/354,675, filed Apr. 28, 2014; Ser. No. 14/248,602, filed Apr. 9, 2014; Ser. No. 14/242,038, filed Apr. 1, 2014; Ser. No. 14/229,061, filed Mar. 28, 2014; Ser. No. 14/343,937, filed Mar. 10, 2014; Ser. No. 14/343,936, filed Mar. 10, 2014; Ser. No. 14/195,135, filed Mar. 3, 2014; Ser. No. 14/195,136, filed Mar. 3, 2014; Ser. No. 14/191,512, filed Feb. 27, 2014; Ser. No. 14/183,613, filed Feb. 19, 2014; Ser. No. 14/169,329, filed Jan. 31, 2014; Ser. No. 14/169,328, filed Jan. 31, 2014; Ser. No. 14/163,325, filed Jan. 24, 2014; Ser. No. 14/159,772, filed Jan. 21, 2014; Ser. No. 14/107,624, filed Dec. 16, 2013; Ser. No. 14/102,981, filed Dec. 11, 2013; Ser. No. 14/102,980, filed Dec. 11, 2013; Ser. No. 14/098,817, filed Dec. 6, 2013; Ser. No. 14/097,581, filed Dec. 5, 2013; Ser. No. 14/093,981, filed Dec. 2, 2013; Ser. No. 14/093,980, filed Dec. 2, 2013; Ser. No. 14/082,573, filed Nov. 18, 2013; Ser. No. 14/082,574, filed Nov. 18, 2013; Ser. No. 14/082,575, filed Nov. 18, 2013; Ser. No. 14/082,577, filed Nov. 18, 2013; Ser. No. 14/071,086, filed Nov. 4, 2013; Ser. No. 14/076,524, filed Nov. 11, 2013; Ser. No. 14/052,945, filed Oct. 14, 2013; Ser. No. 14/046,174, filed Oct. 4, 2013; Ser. No. 14/016,790, filed Oct. 3, 2013; Ser. No. 14/036,723, filed Sep. 25, 2013; Ser. No. 14/016,790, filed Sep. 3, 2013; Ser. No. 14/001,272, filed Aug. 23, 2013; Ser. No. 13/970,868, filed Aug. 20, 2013; Ser. No. 13/964,134, filed Aug. 12, 2013; Ser. No. 13/942,758, filed Jul. 16, 2013; Ser. No. 13/942,753, filed Jul. 16, 2013; Ser. No. 13/927,680, filed Jun. 26, 2013; Ser. No. 13/916,051, filed Jun. 12, 2013; Ser. No. 13/894,870, filed May 15, 2013; Ser. No. 13/887,724, filed May 6, 2013; Ser. No. 13/852,190, filed Mar. 28, 2013; Ser. No. 13/851,378, filed Mar. 27, 2013; Ser. No. 13/848,796, filed Mar. 22, 2012; Ser. No. 13/847,815, filed Mar. 20, 2013; Ser. No. 13/800,697, filed Mar. 13, 2013; Ser. No. 13/785,099, filed Mar. 5, 2013; Ser. No. 13/779,881, filed Feb. 28, 2013; Ser. No. 13/774,317, filed Feb. 22, 2013; Ser. No. 13/774,315, filed Feb. 22, 2013; Ser. No. 13/681,963, filed Nov. 20, 2012; Ser. No. 13/660,306, filed Oct. 25, 2012; Ser. No. 13/653,577, filed Oct. 17, 2012; and/or Ser. No. 13/534,657, filed Jun. 27, 2012, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686; and/or WO 2013/016409, and/or U.S. Pat. Publication No. US 2010-0020170, and/or U.S. patent application Ser. No. 13/534,657, filed Jun. 27, 2012, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149 and/or U.S. Publication No. US-2006-0061008 and/or U.S. patent application Ser. No. 12/578,732, filed Oct. 14, 2009, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. patent application Ser. No. 13/333,337, filed Dec. 21, 2011, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system of a vehicle, said vision system comprising:
  at least one camera disposed at a vehicle and having a field of view exterior of the vehicle;
  wherein said at least one camera is operable to capture images as image data;
  a display disposed in the vehicle and viewable by a driver of the vehicle, wherein said display is operable to display images captured by said at least one camera;
  wherein said display comprises a virtual retinal display that displays images at a virtual distance from the driver;
  wherein, when viewing images captured by said at least one camera and displayed by said virtual retinal display, the driver has the impression that the virtual distance from the driver's eyes to the displayed images is greater than the distance from the driver's eyes to said virtual retinal display; and
  wherein said virtual retinal display comprises (i) a light source, (ii) a transmissive LCD, (iii) a first optic, (iv) an exit pupil enhancement element and (v) a second optic.

2. The vision system of claim 1, wherein one of (i) said virtual retinal display is disposed in an instrument panel of the vehicle, (ii) said virtual retinal display is disposed in an A pillar of the vehicle, (iii) said virtual retinal display is disposed in an interior rear-view mirror of the vehicle, (iv) said virtual retinal display comprises a replacement of the interior rear-view mirror and (v) said virtual retinal display is disposed at eye glasses worn by the driver of the vehicle.

3. The vision system of claim 1, wherein the virtual distance is greater than at least about 1.5 meters.

4. The vision system of claim 1, wherein the virtual distance is greater than about 4 meters.

5. A vision system of a vehicle, said vision system comprising:
   at least one camera disposed at a vehicle and having a field of view exterior of the vehicle;
   wherein said at least one camera is operable to capture images as image data;
   a display disposed in the vehicle and viewable by a driver of the vehicle, wherein said display is operable to display images captured by said at least one camera;
   wherein said display comprises a virtual retinal display that displays images at a virtual distance from the driver;
   wherein, when viewing images captured by said at least one camera and displayed by said virtual retinal display, the driver has the impression that the virtual distance from the driver's eyes to the displayed images is greater than the distance from the driver's eyes to said virtual retinal display; and
   wherein said virtual retinal display comprises (i) a light source module, (ii) an optical scanning module, (iii) an exit pupil expanding unit and (iv) a relay optic that directs light rays towards the driver's eyes, and wherein said light source module comprises (a) one of (i) red, green and blue laser diodes and (ii) red, green and blue light emitting diodes, (b) three control units that vary intensity of the individual color light sources and (c) optical means to combine the three color rays.

6. The vision system of claim 5, wherein one of (i) said optical scanning module comprises rotating scanning mirrors that direct the light rays in the desired directions, (ii) said optical scanning module comprises an array of microscopic scanning mirrors.

7. The vision system of claim 5, wherein said virtual retinal display comprises an exit pupil expanding unit and wherein said exit pupil expanding unit comprises a glass plate with one of (i) a diffusing surface, (ii) a regular micro lens array and (iii) an arbitrarily arranged micro lens array.

8. The vision system of claim 5, wherein said relay optic comprises a combination of spherical or aspheric lens elements.

9. The vision system of claim 5, wherein said relay optic comprises one of (i) a Fresnel lens and (ii) a diffractive optic.

10. The vision system of claim 1, wherein said virtual retinal display comprises (i) a light source, (ii) a transmissive LCD optionally containing ray widening means and (iii) a relay optic.

11. The vision system of claim 1, wherein said virtual retinal display comprises (i) a LED array, (ii) micro lenses above respective individual LEDs which adjust outcoming rays and (iii) a relay optic.

12. The vision system of claim 1, wherein a diopter adjustment is provided that allows the driver to adjust the virtual distance in accordance with the driver's personal needs.

13. The vision system of claim 1, wherein a head tracking unit monitors the actual head position of the driver and, responsive to said head tracking unit, said system adjusts said virtual retinal display.

14. A vision system of a vehicle, said vision system comprising:
   at least one camera disposed at a vehicle and having a field of view exterior of the vehicle;
   wherein said at least one camera is operable to capture images as image data;
   a display disposed in the vehicle and viewable by a driver of the vehicle, wherein said display is operable to display images captured by said at least one camera;
   wherein said display comprises a virtual retinal display that displays images at a virtual distance from the driver; and
   wherein, when viewing images captured by said at least one camera and displayed by said virtual retinal display, the driver has the impression that the virtual distance from the driver's eyes to the displayed images is greater than the distance from the driver's eyes to said virtual retinal display;
   wherein said virtual retinal display comprises (i) a light source, (ii) an optical scanner, (iii) an exit pupil expanding unit and (iv) a relay optic that directs light rays towards the driver's eyes; and
   wherein a head tracking unit monitors the actual head position of the driver and, responsive to said head tracking unit, said system adjusts the virtual retinal display.

15. The vision system of claim 14, wherein said light source comprises (a) one of (i) red, green and blue laser diodes and (ii) red, green and blue light emitting diodes, (b) three control units that vary intensity of the individual color light sources and (c) optical means to combine the three color rays.

16. The vision system of claim 14, wherein said virtual retinal display comprises an exit pupil expanding unit and wherein said exit pupil expanding unit comprises a glass plate with one of (i) a diffusing surface, (ii) a regular micro lens array and (iii) an arbitrarily arranged micro lens array.

17. A vision system of a vehicle, said vision system comprising:
   a plurality of cameras disposed at a vehicle and having respective fields of view exterior of the vehicle;
   wherein said cameras are operable to capture images as image data for a surround vision system of the vehicle;
   wherein said plurality of cameras comprises at least a rear camera disposed at a rear portion of the vehicle and having a rearward field of view exterior of the vehicle;
   wherein said plurality of cameras comprises opposite side cameras disposed at respective side portions of the vehicle and each having a respective field of view exterior of the vehicle;
   a display disposed in the vehicle and viewable by a driver of the vehicle, wherein said display is operable to display images captured by at least some of said cameras;
   wherein said display comprises a virtual retinal display that displays images at a virtual distance from the driver; and
   wherein, when viewing images captured by said plurality of cameras and displayed by said virtual retinal display, the driver has the impression that the virtual distance from the driver's eyes to the displayed images is greater than the distance from the driver's eyes to said virtual retinal display;
   wherein a head tracking unit monitors the actual head position of the driver and, responsive to said head tracking unit, said system adjusts the virtual retinal display; and
   wherein said virtual retinal display comprises (i) a light source, (ii) an optical scanner, (iii) an exit pupil expanding unit and (iv) a relay optic that directs light rays towards the driver's eyes, and wherein said light source comprises (a) one of (i) red, green and blue laser diodes and (ii) red, green and blue light emitting diodes, (b) three control units that vary intensity of the individual color light sources and (c) optical means to combine the three color rays.

18. The vision system of claim 17, wherein said virtual retinal display comprises an exit pupil expanding unit and wherein said exit pupil expanding unit comprises a glass plate with one of (i) a diffusing surface, (ii) a regular micro lens array and (iii) an arbitrarily arranged micro lens array.

* * * * *